United States Patent
Dupuy et al.

(10) Patent No.: US 7,238,738 B2
(45) Date of Patent: *Jul. 3, 2007

(54) THERMOPLASTIC MATERIAL WITH HIGH BARRIER PROPERTIES

(75) Inventors: Carole Dupuy, Brussels (BE); Bruno Echalier, Paris (FR); Hélène Egret, Rouen (FR); Bertrand Lousteau, Paris (FR); Olivier Mathyeu, Marennes (FR)

(73) Assignee: Rhodianyl, La Defense (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/504,997

(22) PCT Filed: Feb. 21, 2003

(86) PCT No.: PCT/FR03/00584

§ 371 (c)(1),
(2), (4) Date: Apr. 22, 2005

(87) PCT Pub. No.: WO03/070818

PCT Pub. Date: Aug. 28, 2003

(65) Prior Publication Data

US 2005/0256238 A1    Nov. 17, 2005

(30) Foreign Application Priority Data

Feb. 22, 2002 (FR) .................................. 02 02266

(51) Int. Cl.
*C08K 3/32* (2006.01)

(52) U.S. Cl. .................... 524/413; 524/414; 524/445; 524/447

(58) Field of Classification Search ........ 524/413–415, 524/445, 447

See application file for complete search history.

(56) References Cited

U.S. PATENT DOCUMENTS

| | | | | |
|---|---|---|---|---|
| 4,507,437 A * | 3/1985 | Kato et al. | ................... | 525/106 |
| 5,482,544 A * | 1/1996 | Okuda et al. | ............ | 106/14.12 |
| 5,656,709 A * | 8/1997 | Fukushima et al. | ............ | 528/9 |
| 5,932,634 A * | 8/1999 | Hosokawa et al. | ......... | 523/209 |
| 5,942,298 A * | 8/1999 | Sakaya et al. | ............. | 428/36.6 |
| 6,465,543 B1 * | 10/2002 | Alexandre et al. | .......... | 523/213 |
| 2004/0033186 A1 * | 2/2004 | Bougelot et al. | ............ | 423/311 |

FOREIGN PATENT DOCUMENTS

JP    11105182    *    4/1999

* cited by examiner

*Primary Examiner*—Peter Szekely

(57) ABSTRACT

The invention relates to a material with high barrier properties toward gases and liquids, characterized in that it comprises a thermoplastic matrix and a nanoparticulate compound based on zirconium and/or titanium phosphate exhibiting individual leaves with an aspect ratio of equal to or greater than 250. Application to the manufacture of films, pipes, hollow bodies or tanks by forming said material.

18 Claims, 1 Drawing Sheet

THERMOPLASTIC MATERIAL WITH HIGH BARRIER PROPERTIES

This application is an application under 35 U.S.C. Section 371 of International Application Number: PCT/FR03/00584 on Feb. 21, 2003.

The present invention relates to the field of materials with a high barrier property, in particular to the field of materials comprising a thermoplastic matrix and a filler and more particularly to the field of materials with a high barrier property, referred to hereinafter as barrier materials, comprising a thermoplastic matrix and a filler dispersed in the form of nanoparticles with an aspect ratio.

The barrier materials of the invention can be used in various applications, in particular in the field of food packaging, in the field of cosmetics or in the field of the transportation and storage of liquids, such as gasoline.

The use of filter-comprising thermoplastic resins as barrier materials is known. Mention may be made, by way of indication, of patent application (Kokai) No. 5-293916, which discloses the use, for the transportation of fuel oil, of a multilayer pipe based on polyamide comprising from 1.5 to 10% by weight of silicate. Likewise, patent application No. EP 1 044 806 discloses a multilayer pipe comprising at least three thermoplastic layers, one of which is made of polyamide comprising from 0.05 to 30% by weight of silicate.

The barrier materials as disclosed above are colored and, for this reason, cannot be used in packaging and in particular food packaging.

The problem which the Applicant Company has sought to solve is that of finding a colorless and preferably transparent barrier material which has good mechanical properties, in particular a good modulus/impact compromise, and a thermal behavior which allows it to be handled at a high temperature.

The Applicant Company has found a novel family of materials exhibiting a good compromise in the properties described above which can thus be used as barrier materials in the packaging or the storage of products, such as foodstuffs, and the storage and transportation of liquids, such as gasoline, for example fuel oil.

The term "barrier material" is understood to mean a material which exhibits a reduced permeability with respect to a fluid. According to the present invention, the fluid can be a gas or a liquid. Oxygen, carbon dioxide and water vapor may in particular be mentioned among the gases to which the material exhibits a low permeability. A barrier material to oxygen and to carbon dioxide may have a considerable advantage, for example for applications in the field of packaging, in particular packaging of foodstuffs.

Mention may be made, as liquids to which the material has to be impermeable, of solvents, in particular solvents representative of gasoline, such as methanol, toluene or isooctane. Materials impermeable to solvents and to gasoline are particularly advantageous, especially for applications in the field of the automobile industry, especially for the manufacture of gasoline tanks or fuel pipes.

The barrier material of the invention comprises, as main constituent, a matrix comprising a thermoplastic polymer.

Mention may be made, as examples of thermoplastic polymers suitable for the invention, of: polylactones, such as poly(pivalolactone), poly(caprolactone) and polymers of the same family; polyurethanes obtained by reaction between diisocyanates, such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and compounds of the same family, and diols with long linear chains, such as poly(tetramethylene adipate), poly(ethylene adipate), poly(1,4-butylene adipate), poly(ethylene succinate), poly(2,3-butylene succinate), polyether diols and compounds of the same family; polycarbonates, such as poly[methanebis(4-phenyl)-carbonate], poly[1,1-etherbis(4-phenyl)carbonate], poly[diphenylmethanebis(4-phenyl)carbonate], poly[1,1-cyclohexanebis(4-phenyl)carbonate] and polymers of the same family; polysulfones; polyethers; polyketones; polyamides, such as poly(4-aminobutyric acid), poly(hexamethylene adipamide), poly(6-aminohexanoic acid), poly(m-xylylene adipamide), poly(p-xylylene sebacamide), poly(2,2,2-trimethylhexamethylene terephthalamide), poly(metaphenylene isophthalamide), poly(p-phenylene terephthalamide) and polymers of the same family; polyesters, such as poly(ethylene azelate), poly(ethylene 1,5-naphthalate), poly(1,4-cyclohexanedimethylene terephthalate), poly(ethylene oxybenzoate), poly(para-hydroxybenzoate), poly(1,4-cyclohexylidenedimethylene terephthalate), poly(1,4-cyclohexylidenedimethylene terephthalate), polyethylene terephthalate, polybutylene terephthalate and polymers of the same family; poly(arylene oxides), such as poly(2,6-dimethyl-1,4-phenylene oxide), poly(2,6-diphenyl-1,4-phenylene oxide) and polymers of the same family; poly(arylene sulfides), such as poly(phenylene sulfide) and polymers of the same family; polyetherimides; vinyl polymers and their copolymers, such as polyvinyl acetate, polyvinyl alcohol, polyvinyl chloride, polyvinylbutyral, polyvinylidene chloride, ethylene-vinyl acetate copolymers and polymers of the same family; acrylic polymers, polyacrylates and their copolymers, such as polyethyl acrylate, poly(n-butyl acrylate), polymethyl methacrylate, polyethyl methacrylate, poly(n-butyl methacrylate), poly(n-propyl methacrylate), polyacrylamide, polyacrylonitrile, poly(acrylic acid), ethylene-acrylic acid copolymers, ethylene-vinyl alcohol copolymers, acrylonitrile copolymers, methyl methacrylate-styrene copolymers, ethylene-ethyl acrylate copolymers, methacrylate-butadiene-styrene copolymers, ABS and polymers of the same family; polyolefins, such as low density poly(ethylene), poly(propylene), low density chlorinated poly(ethylene), poly(4-methyl-1-pentene), poly(ethylene), poly(styrene) and polymers of the same family; ionomers; poly(epichlorohydrins); poly(urethane)s, such as polymerization products of diols, such as glycerol, trimethylolpropane, 1,2,6-hexanetriol, sorbitol, pentaerythritol, polyether polyols, polyester polyols and compounds of the same family, with polyisocyanates, such as 2,4-tolylene diisocyanate, 2,6-tolylene diisocyanate, 4,4'-diphenylmethane diisocyanate, 1,6-hexamethylene diisocyanate, 4,4'-dicyclohexylmethane diisocyanate and compounds of the same family; polysulfones, such as the products of reaction between a sodium salt of 2,2-bis(4-hydroxyphenyl)propane and 4,4'-dichlorodiphenyl sulfone; furan resins, such as poly(furan); cellulose ester plastics, such as cellulose acetate, cellulose acetate butyrate, cellulose propionate and polymers of the same family; silicones, such as poly(dimethylsiloxane), poly(dimethylsiloxane-co-phenylmethylsiloxane) and polymers of the same family; or blends of at least two of the above polymers.

Preference is very particularly given, among these thermoplastic polymers, to polyamides, semiaromatic polyamides, PVC (polyvinyl chloride), PET (polyethylene terephthalate), PPO (polypropylene oxide), polystyrene, polymethyl methacrylate, copolyolefins, such as EVA (polyethylene of vinyl alcohol), and the blends and copolymers based on these (co)polymers.

According to a preferred embodiment of the invention, the thermoplastic matrix is a polyamide chosen from the group consisting of polyamide-6, polyamide-6,6, polyamide-11, polyamide-12, and the blends and copolymers based on these polyamides.

According to a preferred embodiment of the invention, the barrier material of the invention is obtained by introduction, into the matrix or into the medium for the polymerization of the matrix, of a compound based on zirconium and/or titanium phosphate exhibiting an interleaf distance of less than or equal to 15 Å and individual leaves exhibiting an aspect ratio of greater than or equal to 250.

The term "aspect ratio" is understood to mean the ratio of the larger dimension of the leaves of zirconium or titanium phosphate to the thickness of the individual leaf or of the agglomerate of leaves. This thickness of the individual leaf is determined by crystallographic analysis techniques, the larger dimension of a leaf being determined by analysis by transmission electron microscopy (TEM).

The aspect ratio of the particles dispersed in the matrix will increasingly approach the aspect ratio of the individual leaf as the percentage of exfoliation of leaves to individual leaves approaches 100%.

The compound based on zirconium and/or titanium phosphate introduced into the matrix preferably exhibits an interleaf distance of less than or equal to 13 Å.

This compound based on zirconium and/or titanium phosphate comprises an inorganic or organic compound comprising at least one functional group capable of reacting with the acid functional groups of the zirconium and/or titanium phosphate.

For example, such an inorganic or organic compound can be in the form of a cation. Mention may be made, as inorganic compound in the cationic form, by way of example, of metal cations, alkali metal cations, such as $Na^+$, $K^+$ or $Li^+$, or the ammonium ion $NH_4^+$. Without wishing to be committed to any one theory, it is believed that such cations can be exchanged with the protons of the zirconium and/or titanium phosphate.

A cation, such as $Na^+$, $K^+$, $Li^+$ or $NH_4^+$, corresponds to a functional group capable of reacting with the acid functional groups of the zirconium and/or titanium phosphate.

The inorganic compound is preferably the $Na^+$ ion.

According to a specific embodiment of the invention, the inorganic or organic compound comprises a functional group capable of reacting with the acid functional groups of the zirconium and/or titanium phosphate.

This functional group can be a basic functional group. Mention may be made, as basic functional group, of, for example, the amine functional group. The functional group can, for example, be in a neutral or positively charged form.

According to a preferred form, the organic compound is a monoamine. It can, for example, be an aliphatic monoamine, such as n-butylamine.

According to another advantageous form, the organic compound is an amino acid or a lactam. Mention may be made, for example, of caprolactam.

According to another specific embodiment of the invention, the inorganic or organic compound comprises two functional groups capable of reacting with the acid functional groups of the zirconium and/or titanium phosphate.

In particular, the organic compound is a compound according to the following formula (I):

A-R-B  (I)

in which

A and B are identical or different functional groups capable of reacting with the acid functional groups of the zirconium and/or titanium phosphate, R is a substituted or unsubstituted aliphatic, cycloaliphatic or aromatic hydrocarbonaceous radical comprising from 2 to 20 carbon atoms which can comprise heteroatoms.

The compound of formula (I) present in the compound based on zirconium and/or titanium phosphate comprises two functional groups A and B capable of reacting with the acid functional groups of the zirconium and/or titanium phosphate.

The functional groups A and B can, for example, be basic functional groups capable of reacting with the protons of the zirconium and/or titanium phosphate. The functional groups A and B are preferably provided in a neutral or positively charged form. Mention may be made, as examples of functional groups A and B which may be suitable for the invention, of amines, ammoniums or phosphoniums.

Generally, the R radical is not reactive with respect to the acid functional groups of the zirconium and/or titanium phosphate nor with respect to the phosphate in general.

According to a preferred form of the invention, the functional groups A and B are amine functional groups.

Preferably, the compound (I) is chosen from hexamethylenediamine, 2-methylpentamethylenediamine or meta-xylenediamine.

According to a specific embodiment of the invention, the molar ratio $\alpha$ of the number of moles of functional groups capable of reacting of the inorganic or organic compound to the number of moles of the zirconium and/or titanium phosphate is between 0.1 and 0.8.

The term "number of moles of functional groups capable of reacting" is understood to mean the sum of the number of moles of each functional group of the inorganic or organic compound capable of reacting. For example, for a compound comprising a single functional group capable of reacting, the number of moles of functional groups capable of reacting corresponds to the number of moles of the compound. For a compound comprising two functional groups capable of reacting, the number of moles of functional groups capable of reacting corresponds to twice the number of moles of the compound.

The term "number of moles of the zirconium and/or titanium phosphate" is understood to mean the number of moles of elemental phosphorus. For example, one mole of zirconium phosphate compound generally corresponds to two moles of elemental phosphorus.

Preferably, the molar ratio $\alpha$ is between 0.4 and 0.6. Advantageously, the molar ratio $\alpha$ is substantially equal to 0.5.

According to a specific alternative form of the invention, the compound based on zirconium and/or titanium phosphate exhibiting an interleaf distance of less than or equal to 15 Å is obtained by the process comprising the following successive stages:

a) precipitation in acidic medium of a compound based on zirconium and/or titanium phosphate, starting from phosphoric acid and from a zirconium compound and/or from a titanium-based compound or from mixed compounds based on titanium and on zirconium, the titanium and/or the zirconium being in the IV oxidation state, b) crystallization of the compound, c) treatment of the crystallized compound, in liquid medium, at a pH of between 3 and 9.

The preparation process according to the invention comprises at least the three successive stages a), b) and c). It can comprise other process stages or phases, before, after or between these stages. They are, for example, phases of washing, of purification, of filtration, of dilution, of centrifuging or of addition of compounds in order to adjust certain process parameters, such as the pH or the ionic strength. The implementation of such process phases will become apparent in particular in the light of the examples which are presented below.

Stage a) consists of a precipitation of a compound based on zirconium and/or titanium phosphate. The preparation of such precipitates is known to a person skilled in the art. It is carried out starting from phosphoric acid and from a zirconium compound and/or from a titanium compound, the zirconium and/or the titanium being in the IV oxidation state. Mention is made of zirconium and/or titanium tetrahalides or zirconium and/or titanium oxyhalides, in particular zirconium oxychloride and titanium oxychloride. Use may also be made of mixed zirconium- and titanium-based compounds.

A simplified balance of the precipitation reaction is, for example, as follows:

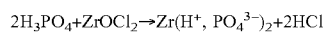

$$2H_3PO_4 + ZrOCl_2 \rightarrow Zr(H^+, PO_4^{3-})_2 + 2HCl$$

The precipitation is preferably carried out in aqueous medium. The use of phosphoric acid results in the precipitation medium being acidic. The precipitation can advantageously be carried out at acidic pH, preferably controlled acidic pH, for example of between 0.5 and 2. For this purpose, an acid may be used to complement the precursors of the precipitate. Mention is made, by way of example, of hydrochloric acid.

The precipitate may crystallize as a lamellar structure at ambient temperature without it being necessary to carry out a crystallization operation distinct from the precipitation stage.

However, it may be advantageous to carry out a distinct crystallization stage. Such a stage makes it possible to obtain, for the precipitated compound, a more marked and/or more uniform lamellar structure. The crystallization can be carried out by heat treatment in water or in an aqueous solution, for example by immersion of the compound in water at a temperature of between 100° C. and 200° C. The crystallization is preferably carried out in an acidic aqueous solution, for example a phosphoric acid solution. The duration of crystallization can be several hours.

The crystallization stage is advantageously preceded by a phase of washing the precipitate, making it possible in particular to remove the ionic entities resulting from the precipitation reaction.

The crystallization stage is advantageously followed by a washing and centrifuging phase. According to a preferred characteristic, the pH measured in the aqueous phase of a dispersion comprising the crystallized compound, with a solids content of 20% by weight, is between 0.5 and 2.

According to a preferred characteristic of the process, all the stages of the process are thus carried out at acidic pH between 0.5 and 2. According to another preferred characteristic, the lamellar compound is never dried, the only operations for the removal of water being filtration or centrifuging operations. The term "drying operation" is understood here to mean an operation during which the compound is introduced into a hot atmosphere devoid of water for a period of time of greater than 15 minutes, for example into an oven.

The compound crystallizes in the α phase of zirconium phosphate. The structure of this phase has been described, for example, in J. Inorg. Nucl. Chem., vol. 26, p. 117-129. This phase exhibits a lamellar structure, with protons intercalated between the lamellae. Without wishing to be committed to any one theory, it is believed that these protons can be exchanged by a positively charged chemical entity.

The treatment stage c) consists in treating the crystallized compound in liquid medium at a pH of between 3 and 9.

The liquid medium is preferably an aqueous solution, in which the compound based on zirconium phosphate is dispersed. The aqueous solution comprises an inorganic or organic compound of such a nature and/or in such an amount that the pH is between 3 and 9. According to a preferred characteristic, the pH is between 4 and 7.

The inorganic or organic compound is chosen from compounds which, in aqueous solution, exhibit a pH of greater than 3, preferably greater than 7.

The compound is generally the compound of formula (I) described above, corresponding to the compound based on zirconium and/or titanium phosphate which it is desired to prepare. The use of these organic compounds may be very particularly indicated for the use of the compound with a lamellar structure for the reinforcement of polyamides.

According to a preferred embodiment of the second subject matter of the invention, the organic compound is hexamethylenediamine.

By way of example, the inorganic compound for the treatment at a pH of between 2 and 7 can also be chosen from alkali metal or alkaline earth metal hydroxides, for example sodium hydroxide; inorganic compounds of the ammonium ion, such as ammonium hydroxide; or lithium, sodium or potassium cations, optionally in the presence of a basic agent. The organic compound can, for example, be caprolactam or ammonia. These compounds may be indicated for the use of the compound with a lamellar structure for the reinforcement of polyamides.

After the treatment stage, the compound can be washed and/or separated from the liquid medium, for example by filtration or evaporation of the liquid medium, preferably evaporation of water. It can, also be dried.

The inorganic or organic compound of the treatment stage c) is appropriately chosen according to the compound based on zirconium and/or titanium phosphate which it is desired to prepare.

There is thus obtained an inorganic compound with a lamellar structure which can easily exfoliate into platelet particles. The compound can be conditioned in various forms. It can be conditioned in the powder form, after removal of the liquid medium and optionally drying. It can be conditioned in the form of a dispersion in a liquid medium, for example water.

The form of the conditioning generally depends on the use for which it is intended. Thus, for the use for the reinforcement of synthetic polymers, the compound can advantageously be introduced in the form of a dispersion into the medium for the synthesis of the polymer. Preferably, the compound is introduced in the form of a dispersion into the medium comprising the monomers which are the source of the synthetic polymer.

The barrier material of the invention, in addition to the thermoplastic matrix and the compound based on zirconium and/or titanium phosphate, can also comprise other additives, such as, for example, stabilizers, plasticizers, flame-retardants, dyes, lubricants or catalysts. This list does not have any limiting nature. It can additionally comprise other reinforcing additives, such as modifiers of the impact strength, such as optionally grafted elastomers, inorganic reinforcements, such as clays or kaolin, or fibrous reinforcements, such as glass fibres, aramide fibres or carbon fibres.

Any method which makes it possible to obtain a dispersion of compounds in a macromolecular material can be used to prepare the composition. A first process consists in blending the lamellar compound in a thermoplastic material in the melt form and in optionally subjecting the blend to high shearing, for example in a twin-screw extrusion device, in order to achieve good dispersion. Another process consists in mixing the compound to be dispersed with the monomers in the polymerization medium and then in carrying out the polymerization. Another process consists in blending, with a thermoplastic polymer in the melt form, a concentrated blend of a thermoplastic polymer and of dispersed particles, which blend is prepared, for example, according to one of the processes described above.

There is no restriction on the form under which the lamellar compound is introduced into the medium for the synthesis of the macromolecular compound or into a molten thermoplastic polymer. It can, for example, be introduced in the form of a solid powder or in the form of a dispersion in water or in an organic dispersant.

In the context of polyamide-based barrier materials, an advantageous embodiment consists in introducing, into the polymerization medium, a dispersion in water of the lamellar compound based on zirconium phosphate. In particular, the dispersion can be introduced into the medium comprising the monomers of the polyamide to be manufactured. The polymerization processes carried out in the context of this embodiment are conventional processes.

The proportion by weight of the lamellar compound in the composition is preferably less than or equal to 5%.

According to a preferred embodiment of the invention, at least a portion of the compound based on zirconium and/or titanium phosphate is dispersed in the form of leaves in the matrix.

The compound based on zirconium and/or titanium phosphate of the invention advantageously exhibits individual leaves exhibiting an aspect ratio of greater than or equal to 500.

The invention also relates to articles obtained by forming the barrier material of the invention, for example by molding, extrusion, injection molding or extrusion-blow molding. The preferred articles of the invention are in particular films, pipes, hollow bodies or tanks. These articles can be used in numerous fields, such as the automobile industry or packaging, and in numerous applications, such as fuel pipes or tanks, films for packaging foodstuffs, and the like.

Other details or advantages of the invention will become more clearly apparent in the light of the examples below, given solely by way of indication.

EXAMPLE 1

Figure 1:
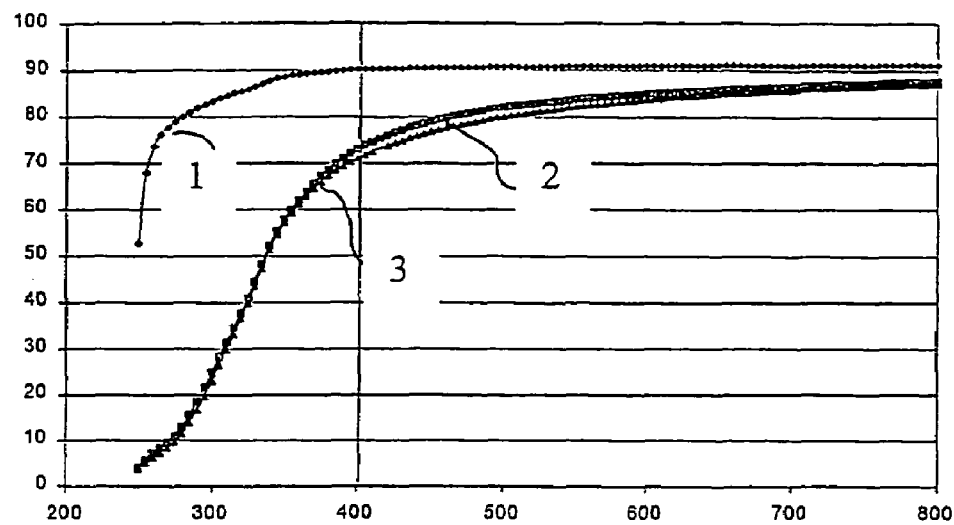
FIG. 1 displays curves whose abscissae represent the wave length (nm) and ordinates represent the transmission (%) of samples of materials of the invention.

Preparation of a Crystallized Compound Based on Zirconium Phosphate.

The following reactants are used:
Hydrochloric acid (Prolabo, 36%, d=1.19)
Phosphoric acid (Prolabo, 85%, d=1.695)
Deionized water
Zirconium oxychloride (in the powder form) comprising 32.8% of $ZrO_2$.

Stage a): precipitation

An aqueous zirconium oxychloride solution comprising 2.1 mol/l of $ZrO_2$ is prepared beforehand.

The following solutions:

| | |
|---|---|
| Hydrochloric acid | 50 ml |
| Phosphoric acid | 50 ml |
| Deionized water | 150 ml | are added at ambient temperature to a 1 litre stirred reactor. After stirring the mixture, 140 ml of the 2.1M aqueous zirconium oxychloride solution are added continuously with a flow rate of 5.7 ml/min.

Stirring is maintained for 1 hour after the end of the addition of the zirconium oxychloride solution.

After removing the aqueous mother liquors, the precipitate is washed by centrifuging at 4 500 rev/min with 1 200 ml of 20 g/l $H_3PO_4$ and then with deionized water until a conductivity of 6.5 mS (supernatant) is achieved. A cake of the precipitate based on zirconium phosphate is obtained.

Stage b): Crystallization

The cake is dispersed in 1 litre of 10M aqueous phosphoric acid solution and the dispersion thus obtained is transferred into a 2 litre reactor and then heated to 115° C. This temperature is maintained for 5 hours.

The dispersion obtained is washed by centrifuging with deionized water to a conductivity of less than 1 mS (supernatant). The cake resulting from the final centrifuging is redispersed, so as to obtain a solids content in the region of 20%; the pH of the dispersion is between 1 and 2.

A dispersion of a crystallized compound based on zirconium phosphate is obtained, the characteristics of which dispersion are as follows:

Size and morphology of the particles: analysis with a Transmission Electron Microscope (TEM) demonstrates that a lamellar structure has been obtained, the lamellae of which structure exhibit a hexagonal shape with a size of between 200 and 500 nm. The particles are composed of a stack of substantially parallel platelets, the thickness of the stacks along the direction perpendicular to the platelets being approximately 200 nm.

XRD analysis demonstrates that the crystallized phase $Zr(HPO_4)_2 \cdot 1H_2O$ has been obtained Solids content: 18.9% (by weight)

pH: 1.8

Conductivity: 8 mS

EXAMPLES 2-3

Treatment of the Compound With an Inorganic Base (Stage c))

805 g (on a dry basis) of product resulting from example 1 are centrifuged. The centrifuging pellet is redispersed in a $10^{-3}$ mol/l aqueous sodium hydroxide solution (500 ml). Three washing operations are carried out according to these same conditions. The cake resulting from the last centrifuging is redispersed in 500 ml of $10^{-3}$ mol/l sodium hydroxide solution. The pH is adjusted to 5 (example 2) or to 3 (example 3) by addition of 8 mol/l sodium hydroxide. The dispersion is centrifuged and the pellet is redispersed in 300 ml of purified water (solids content: 30% by weight). The final conductivity of the suspension is less than 1 mS.

EXAMPLE 4

Treatment of the Compound With an Organic Base (Stage c))

The product resulting from example 1 is neutralized by addition of hexamethylenediamine: a 70% aqueous HMD solution is added to the dispersion until a pH of 5 is obtained. The dispersion thus obtained is homogenized using an Ultra-Turrax. The final solids content is adjusted by addition of deionized water (solids content: 15% by weight).

EXAMPLE 5

Treatment of the Compound with Caprolactam (Stage c))

Caprolactam is incorporated in the inorganic sol obtained according to example 1 (33% by weight of caprolactam with respect to the solids content). The pH measured in the solution is 3.3. Subsequently, by distillation of the water, a powder is recovered which comprises the corresponding caprolactam fraction.

EXAMPLES 6 TO 8

Barrier Material Comprising Platelet Particles Based on Zirconium Phosphate.

A polyamide-6 is synthesized from caprolactam according to a conventional process while introducing, into the polymerization medium, an aqueous dispersion obtained in example 4. The proportion of compound based on zirconium phosphate introduced is 2.6% (example 7) and 4.2% (example 8) by weight with respect to the total mass of the material. A polymer not comprising the compound based on zirconium phosphate is also synthesized (comparative example 6).

After polymerization, the polymer is formed into granules. The latter are washed to remove the residual caprolactam. For this purpose, the granules are immersed in an excess of water at 90° C. for a few hours and are then dried under low vacuum (<0.5 mbar) for 16 hours at 110° C.

Mechanical Properties

Various tests were carried out on the materials according to the measurement methods indicated below to determine the mechanical properties of the materials:

Tensile strength, measured according to the ISO 527 standard after conditioning the test specimen at 23° C. and at a relative humidity of 50%.

Tensile modulus, measured according to the ISO 527 standard after conditioning the test specimen at 23° C. and at a relative humidity of 50%.

Flexural modulus, measured according to the ISO 178 standard after conditioning the test specimen at 23° C. and at a relative humidity of 50%.

Heat deflection temperature (HDT), measured according to the ISO 75 standard under a load of 1.81 N/mm².

The various compositions and the evaluations are presented in table 1 below.

TABLE 1

| | Examples | |
|---|---|---|
| | 6 (comparative) | 7 |
| Proportion by weight of zirconium phosphate compound (%) | 0 | 2.6 |
| Tensile strength (N/mm²) | 48 | 101 |
| Tensile modulus (N/mm²) | 3000 | 3900 |
| Flexural modulus (N/mm²) | 2900 | 3800 |
| HDT under a load of 1.81 N/mm² (° C.) | 52 | 76 |

A polyamide-based material is obtained for which the tensile strength, the modulus and the heat deflection temperature are greater than those of a polyamide not comprising the inorganic compound.

Preparation of Films

The above polymer granules are formed by extrusion on a device with the CMP trademark.

The characteristics of the processing are as follows:

Temperature of the extruder: between 260 and 290° C.

Screw speed: 36 rpm

Motor torque:
  Example 6 (in amperes): 8-10A
  Example 7 (in amperes): 10-16A

Variable drawing rate (film thicknesses between 50 and 150 µm).

The processing makes it possible to produce films with different thicknesses which are tested for permeability to the gases $O_2$ and $CO_2$ and to water vapor.

The films are conditioned at 23° C. and 0% RH (relative humidity) for 48 h before being subjected to the determination of their permeability to the gases $O_2$ and $CO_2$ and to water vapor, according to the procedures described below.

Permeability to Oxygen

Measurement of the coefficient of transmission of oxygen according to the ASTM D3985 standard under the following specific conditions.

Measurement conditions:

| | |
|---|---|
| Temperature: | 23° C. |
| Humidity: | 0% RH |
| Measurements with 100% oxygen on 3 test specimens of 0.5 dm² | |
| Stabilization time: | 24 h |
| Measuring device: | Oxtran 2/20 |

Permeability to Carbon Dioxide

Measurement of the coefficient of transmission of carbon dioxide according to the document ISO DIS 15105-2, Annex B (chromatographic detection method).

Measurement Conditions:

| | |
|---|---|
| Temperature: | 23° C. |
| Humidity: | 0% RH |
| Measurements on 3 test specimens of 0.5 dm² | |
| Stabilization time | 48 h |
| Measuring device: | Oxtran 2/20 |

Chromatographic Conditions:

| | |
|---|---|
| Oven: | 40° C. |
| Columns: | Porapak Q |

Detection by flame ionization, the detector being preceded by a methanization oven.

Calibration of the chromatograph with standard gases comprising a known concentration of carbon dioxide.

Permeability to Water Vapor

Determination of the coefficient of transmission of water vapor according to the NF H 00044 standard (Lyssy device).

Measurement Conditions:

| | |
|---|---|
| Temperature: | 38° C. |
| Humidity: | 90% RH |
| Measurements on 3 test specimens of 0.5 dm² | |
| Calibration with 26.5, 14 and 2.1 g/m² · 24 h reference films | |

Results

The presence of ZrP fillers at 2.6% (example 7) has a significant effect on the permeability to the gases and to water vapor of the nylon-6 films (table 2). The test specimens tested have different thicknesses of between 50 and 110 µm.

TABLE 2

| | Ex. 6 (comparative) | Ex. 7 | Reduction with respect to Ex. 6 | Ex. 8 | Reduction with respect to Ex. 6 |
|---|---|---|---|---|---|
| $O_2$ permeability (cm³ · mm/m² · 24 h · bar) | 1.06 | 0.34 | 0.32 | 0.19 | 0.18 |
| $CO_2$ permeability (cm³ · mm/m² · 24 h · bar) | 4.83 | 1.05 | 0.22 | 0.53 | 0.11 |
| $H_2O$ permeability (g · mm/m² · 24 h) | 11.55 | 5.9 | 0.51 | 4.04 | 0.35 |

Permeability to Oxygen

The results obtained with 2.6% of α-ZrP (example 7) give, at a comparable thickness, a reduction in permeability to oxygen which varies between 61% (at 50 µm) and 66% (at 90 µm) with respect to the film devoid of α-ZrP of example 6. With 4.2% of α-ZrP (example 8), the permeability to oxygen is reduced by approximately 80%.

Permeability to Carbon Dioxide

The permeability to carbon dioxide of the films comprising 2.6% (example 7) and 4.2% (example 8) of α-ZrP as filler is lower than that of the additive-free PA-6 films (example 6). The reduction in permeability to carbon dioxide varies from 67% (at 50 µm) to 85% (at 90 µm). With 4.2% of α-ZrP, the permeability to carbon dioxide is reduced by approximately 90%.

Permeability to Water Vapor

The presence of an α-ZrP filler at a level of 2.6% (example 7) in the nylon-6 films also reduces the permeability to water vapor. The reduction in permeability to water vapor varies from 33% (at 50 µm) to 48% (at 90 µm) with respect to additive-free PA-6 films (example 6). With 4.2% of α-ZrP (example 8), the reduction in permeability is 65%.

Measurements of UV-Visible Absorption

The materials of examples 6 to 8 obtained by synthesis are extruded through a flat die. The films obtained have a thickness of 350 µm.

The films are analyzed in total transmission on an L900 with a 150 mm integration sphere. The wavelength varies between 250 and 800 nm. The results are mentioned in FIG. 1, in which curve 1 corresponds to example 6, curve 2 to example 7 and curve 3 to example 8. In FIG. 1, the abscissae represent the wavelength (nm) and the ordinates represent the transmission (%).

FIG. 1 clearly shows that the presence of the α-ZrP modifies the transmission spectrum of the additive-free polyamide. As it happens, the filler absorbs in the UV region (λ<400 nm) and, less significantly, in the visible region. It is also observed that the transmission for a polymer comprising 4.2% of α-ZrP filler is substantially equivalent to the transmission of a polymer comprising 2.6% thereof.

Resistance of the Materials to Aging

The materials of examples 6 to 8 obtained by synthesis are extruded through a flat die. The films obtained have a thickness of 350 µm.

The artificial aging is simulated in a test carried out with a Xenotest 1200 device (xenon lamps). The test conditions are as follows:

Black panel temperature of 63° C.

Irradiance of 65 W/m² (in the 290-400 nm region)

Alternation 102 minutes dry atmosphere and 18 minutes rain atmosphere.

The calorimetric variations of the sample are monitored every 200 h approximately by measurement with a Minolta 508-d spectrocolorimeter (specular included).

Figure 2:
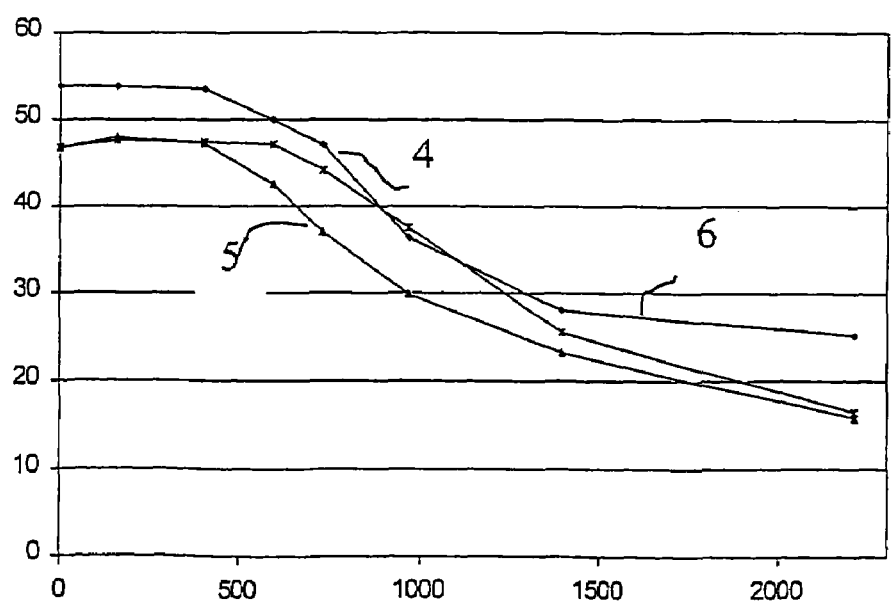
FIG. 2 displays curves whose abscissae represent the hours of exposure of artificial aging and ordinates represent the contrast of samples of materials of the invention.

The aging of the films is reflected by a loss in transparency characterized by a decline in the value of the contrast. The results are mentioned in FIG. 2, in which curve 4 corresponds to example 6, curve 5 to example 7 and curve 6 to example 8. In FIG. 2, the abscissae represent the hours of exposure and the ordinates represent the contrast.

If the difference in contrast at the start (slight loss in transparency due to the presence of the fillers) is taken into account, it is observed that the presence of the α-ZrP in the PA-6 does not modify the rate of decomposition of the polymer.

EXAMPLES 7-9

Polyamide-11 Compositions Comprising Platelet Particles Based on Zirconium Phosphate A polyamide-11 is synthesized according to a conventional process while introducing, into the polymerization medium, the aqueous dispersion obtained in example 2. The proportion of compound based on zirconium phosphate introduced is 2 or 4% by weight with respect to the mass of material (examples 7 and 8). A polyamide-11 not comprising the zirconium phosphate compound is also synthesized (comparative example 9).

After polymerization, the polymer is formed into granules. The latter are washed to remove the residual monomer and are then dried under low vacuum (<0.5 mbar) for 16 h at 110° C.

The monitoring of the average masses (table 1) of the polymers obtained shows that the introduction of the filler does not have a harmful effect on the progression of the polymerization.

| Example No. | % compound introduced | $M_w$ | | $M_n$ | |
|---|---|---|---|---|---|
| 7 | 2 | 74 850 | g/mol | 30 850 | g/mol |
| 8 | 4 | 71 400 | g/mol | 30 880 | g/mol |
| 9 | 0 | 70 430 | g/mol | 26 800 | g/mol |

Mechanical Characterization

Bending tests are carried out according to the ISO 178:93 standard and impact strength tests are carried out according to the ISO 179:93 standard.

The results obtained are summarized in the following table.

| Example | % compound introduced | Flexural modulus (E) in MPa | Charpy impact at 23° C. (kJ/m²) ISO 179: 93-1eA | Charpy impact at −40° C. (kJ/m²) ISO 179: 93-1eU |
|---|---|---|---|---|
| 7 | 2 | 1434 | 10 | 11.7 |
| 9 | 0 | 1143 | 12.5 | 13.2 |

Permeability to M15 Gasoline (60° C.)

Principle: DCI platine/two-dimensional GC:

The volatile materials are extracted directly from the sample by the DCI platine technique: the volatile materials are desorbed by flushing with nitrogen at a controlled temperature and are then concentrated in a cryogenic trap filled with Tenax®.

Introduction into the polar chromatographic column is carried out by rapid reheating of the trap. The volatile materials are entrained by helium into the column toward the FID detector.

Principle of the measurement: The chromatography device in the two-dimensional gas phase is used in dynamic headspace mode. It makes it possible to analyze the stream of solvent traversing a polymer membrane for a trapping time t. The measurement cell (vial) has to be inverted in the oven of the DCI platine in order to ensure contact between the polymer and the gasoline. By summing all the areas detected as a function of the time, the curve of the flows is then obtained. It will thus be possible to deduce therefrom the respective flows of the different solvents constituting the gasoline studied (slope of the curve under stationary conditions) and the coefficient of permeability.

| | |
|---|---|
| Device | DCI Platine/Two-dimensional GC |
| Column | Innowax/D = 0.32 mm/L = 30 m/ thickness = 0.5 µm 70° C.-1 min/10° C./ min/130° C.-12 min |
| Platine oven temperature | 60° C. |
| Permeability | M15 gasoline |
| Test surface area | 19.41 mm² |
| Purge gas | Nitrogen |
| Carrier gas | Helium |
| Column/split total flow rate | 30/27.9 ml/min |
| Column pressure | 0.6 bar |
| FID detector temperature | 280° C. |

Results:

The M15 gasoline is composed by volume: 15% of methanol, 42.5% toluene and 42.5% isooctane (2,2,4-trimethylpentane)

| Reference: PA-11 Films | % compound introduced | Total M15 flow g · mm/m² · 24 h | MeOH flow g · mm/m² · 24 h | Toluene flow g · mm/m² · 24 h | Isooctane flow g · mm/m² · 24 h |
|---|---|---|---|---|---|
| 9 | Control | 576 | 317 | 236 | 23 |
|   | 0% | 713 | 411 | 260 | 42 |
| 7 | 2% | 304 | 209 | 89 | 5.4 |
| 8 | 4% | 159 | 118 | 38 | 2.8 |

The incorporation of approximately 2% of compound (example 7) makes it possible to reduce by a factor of 2 the M15 gasoline flow at 60° C. of the control PA-11 (example 9).

Permeability to Oxygen

Experimental conditions: The measurements are carried out on an Oxtran 1000 H device.

The tests were carried out using the area reducer. The values given in the tables of results are all adjusted to a thickness of 50 µm.

The films were conditioned in the following way:

For the measurements carried out at 23° C. under 0% RH: two days under oxygen.

For the measurements carried out at 23° C. under 75% RH: three days under oxygen.

Results:

Measurements carried out at 23° C. and at 0% RH.

| Films | % of compound | Thickness (μm) | Standard deviation | Value of the oxygen flow (cc/m² · 24 h) | Value of the oxygen flow (cc · 50 μm/ m² · 24 h) |
|---|---|---|---|---|---|
| Example 9 | 0% | 54 | 3.7 | 264.8 | 286.0 |
| Example 7 | 2% | 77.3 | 11.9 | 133.6 | 206.5 |
| Example 8 | 4% | 83.4 | 30.6 | 125.1 | 208.7 |

Measurements carried out at 23° C. and at 75% RH.

| Films | % compound introduced | Thickness (μm) | Standard deviation | Value of the oxygen flow (cc/m² · 24 h) | Value of the oxygen flow (cc · 50 μm/ m² · 24 h) |
|---|---|---|---|---|---|
| Example 9 | 0% | 54 | 3.7 | 302.6 | 326.8 |
| Example 7 | 2% | 77.3 | 11.9 | 145.8 | 225.4 |
| Example 8 | 4% | 83.4 | 30.6 | 141.3 | 235.7 |

What is claimed is:

1. A material with high barrier properties toward gases and liquids, comprising a thermoplastic matrix and a nanoparticulate compound based on zirconium phosphate, $Zr(HPO_4)_2$, exhibiting individual leaves with an aspect ratio of equal to or greater than 250 and wherein said compound comprises a compound consisting essentially of an inorganic compound being $Na^+$ ion or an organic compound being an amino acid, a lactam hexamethylenediamine, 2-methylpentamethylenediamine or meta-xylenediamine comprising at least one functional group capable of reacting with the acid functional groups of the zirconium phosphate.

2. The barrier material as claimed in claim 1, wherein the thermoplastic matrix is selected from the group consisting of polyamides, polymethyl methacrylate, PET, polystyrene, copolyolefins, blends thereof, and copolymers thereof.

3. The barrier material as claimed in claim 2, wherein the thermoplastic matrix is a polyamide selected from the group consisting of polyamide-6, polyamide-6,6, polyamide-11, polyamide-12, blends thereof, and copolymers thereof.

4. The barrier material as claimed in claim 1, wherein the compound based on zirconium phosphate present a proportion by weight in the material of less than or equal to 5%.

5. The barrier material as claimed in claim 1, wherein at least a portion of the compound based on zirconium phosphate is dispersed in the form of leaves.

6. The barrier material as claimed in claim 1, wherein the compound based on zirconium phosphate exhibits individual leaves with an aspect ratio of greater than or equal to 500.

7. The barrier material as claimed in claim 1, made by the process of adding into the matrix or into a medium for the polymerization of the matrix, of a compound based on zirconium phosphate exhibiting an interleaf distance of less than or equal to 15 Å.

8. The barrier material as claimed in claim 7, wherein the interleaf distance is less than or equal to 13 Å.

9. The barrier material as claimed in claim 1, wherein the inorganic or organic compound is in a cationic form.

10. The barrier material as claimed in claim 1, wherein the functional groups capable of reacting of the inorganic or organic compound and the zirconium phosphate present α molar ratio a of between 0.1 and 0.8.

11. The barrier material as claimed in claim 10, wherein the ratio α is between 0.4 and 0.6.

12. The barrier material as claimed in claim 11, wherein the ratio α is equal to about 0.5.

13. The barrier material as claimed in claim 7, wherein the compound based on zirconium phosphate, optionally dispersed in a liquid, is obtained by the process comprising the following successive steps:
a) precipitation in acidic medium of a compound based on zirconium and/or titanium phosphate, starting from phosphoric acid and from a zirconium compound phosphate or from mixed compounds based on titanium and on zirconium, the titanium and the zirconium being in the IV oxidation state,
b) crystallization of the compound, and
c) treatment of the crystallized compound, in liquid medium, at a pH of between 3 and 9.

14. The barrier material as claimed in claim 7, wherein an aqueous solution of the compound based on zirconium phosphate is added into the medium for the polymerization of the matrix.

15. A film, pipe, hollow body or tank obtained by forming a material as claimed in claim 1.

16. The barrier material as claimed in claim 1, wherein the organic compound is hexamethylenediamine, 2-methylpentamethylenediamine or meta-xylenediamine.

17. The barrier material as claimed in claim 7, wherein the organic compound is hexamethylenediamine, 2-methylpentamethylenediamine or meta-xylenediamine.

18. The barrier material as claimed in claim 13, wherein the organic compound is hexamethylenediamine, 2-methylpentamethylenediamine or meta-xylenediamine.

* * * * *